US008690166B2

(12) United States Patent
Peota et al.

(10) Patent No.: US 8,690,166 B2
(45) Date of Patent: Apr. 8, 2014

(54) CUP HOLDER FOR A SHOPPING CART

(75) Inventors: Robert D. Peota, Minneapoliis, MN (US); Scott A. Meyer, Minneapolis, MN (US); Paul A. Yun, Melrose Park, PA (US); Levi Wilson, Wagoner, OK (US); John W. Watkins, Wagoner, OK (US); Jerrod D. Mullins, Wagoner, OK (US)

(73) Assignee: Target Brands, Inc., Minneapolis, MN (US)

( * ) Notice: Subject to any disclaimer, the term of this patent is extended or adjusted under 35 U.S.C. 154(b) by 1345 days.

(21) Appl. No.: 11/690,921

(22) Filed: Mar. 26, 2007

(65) Prior Publication Data
US 2008/0237284 A1    Oct. 2, 2008

(51) Int. Cl.
*B62D 39/00* (2006.01)
*B60R 7/00* (2006.01)
*B65D 25/24* (2006.01)

(52) U.S. Cl.
USPC ....... 280/33.992; 224/411; 220/482; 220/738

(58) Field of Classification Search
USPC ........... 224/441, 411; 206/549, 562; 220/482, 220/480, 476, 737, 738
See application file for complete search history.

(56) References Cited

U.S. PATENT DOCUMENTS

| D162,959 | S | * | 4/1951 | Janes et al. ..................... D7/620 |
| 2,633,278 | A | | 3/1953 | Muniz |
| 2,719,414 | A | | 10/1955 | Davis |
| 2,879,023 | A | * | 3/1959 | Barrier et al. ............ 248/231.41 |
| 2,906,124 | A | | 9/1959 | Chaney |
| 3,036,717 | A | | 5/1962 | Johnson |
| 3,113,677 | A | | 12/1963 | Johnson |
| 3,269,683 | A | | 8/1966 | Shinaver |
| 3,707,272 | A | | 12/1972 | Rasmussen |
| D228,335 | S | | 9/1973 | Jackson |
| D279,836 | S | | 7/1985 | Tanaka |
| 4,635,425 | A | | 1/1987 | Cova |
| 4,865,237 | A | * | 9/1989 | Allen ........................... 224/552 |
| 4,896,858 | A | | 1/1990 | Sokolski et al. |
| 4,915,337 | A | | 4/1990 | Iwasaki |
| 4,998,700 | A | | 3/1991 | McKaig |
| 5,020,755 | A | | 6/1991 | Frankel |
| 5,106,046 | A | | 4/1992 | Rowles et al. |
| 5,170,981 | A | | 12/1992 | Lin |
| D358,303 | S | | 5/1995 | Guarrera et al. |
| 5,464,183 | A | | 11/1995 | McConnell et al. |
| 5,533,656 | A | * | 7/1996 | Bonaldi ........................ 224/667 |
| D373,935 | S | | 9/1996 | Cole et al. |
| D395,205 | S | | 6/1998 | Inwood et al. |
| 5,813,644 | A | * | 9/1998 | Bergin ....................... 248/311.2 |

(Continued)

FOREIGN PATENT DOCUMENTS

FR    2781552 A1    7/1998

*Primary Examiner* — J. Allen Shriver, II
*Assistant Examiner* — Chiedu Chibogu
(74) *Attorney, Agent, or Firm* — Nixon & Vanderhye P.C.

(57) ABSTRACT

A cup holder for a shopping cart includes a container ring and a securing mechanism. The container ring is configured to removably hold a beverage container while the securing mechanism is configured for removably securing the container ring relative to a shopping cart. The securing mechanism includes a first portion configured for slidable mounting in a first direction onto a top edge of a wall of a basket of the shopping cart. A second portion of the securing mechanism is configured for slidable insertion, in a second direction generally perpendicular to the first direction, into a hole in the basket of the shopping cart.

19 Claims, 5 Drawing Sheets

(56) References Cited

U.S. PATENT DOCUMENTS

| | | | |
|---|---|---|---|
| 5,857,601 A * | 1/1999 | Greenwood | 224/409 |
| 5,924,615 A * | 7/1999 | McGarrah | 224/404 |
| 5,938,091 A * | 8/1999 | Bergin et al. | 224/411 |
| 5,944,238 A | 8/1999 | Stark | |
| 5,992,678 A * | 11/1999 | Willey | 220/735 |
| 6,019,335 A | 2/2000 | Sehati | |
| 6,029,380 A | 2/2000 | Goddard | |
| 6,186,382 B1 | 2/2001 | Bergin et al. | |
| 6,231,058 B1 * | 5/2001 | Kimbrough et al. | 280/33.992 |
| 6,260,811 B1 | 7/2001 | O'Neil | |
| 6,299,116 B1 * | 10/2001 | Levesque | 248/312.1 |
| 6,390,427 B1 | 5/2002 | McConnell et al. | |
| 6,467,839 B1 * | 10/2002 | Kain | 297/188.14 |
| 6,637,617 B2 * | 10/2003 | Eisenbraun et al. | 220/720 |
| 6,644,524 B1 * | 11/2003 | Garvin | 224/411 |
| D484,753 S | 1/2004 | Giampavolo | |
| 6,682,034 B1 | 1/2004 | Vial | |
| D489,577 S | 5/2004 | Giampavolo | |
| 6,749,204 B2 | 6/2004 | Werner | |
| D497,779 S | 11/2004 | Giampavolo | |
| D515,879 S * | 2/2006 | Gomes et al. | D7/620 |
| D529,765 S * | 10/2006 | Gomes et al. | D7/620 |
| D566,537 S * | 4/2008 | Wen-Po | D8/395 |
| 7,494,135 B2 * | 2/2009 | Ash et al. | 280/33.991 |
| D589,214 S * | 3/2009 | Johnston | D30/131 |
| D604,564 S * | 11/2009 | Walter | D7/620 |
| 7,614,516 B2 * | 11/2009 | Beggins | 215/386 |
| 2004/0108346 A1 * | 6/2004 | Pablo | 224/251 |
| 2004/0129852 A1 * | 7/2004 | Giampavolo | 248/315 |
| 2005/0029273 A1 * | 2/2005 | Hechmati | 220/737 |
| 2005/0263969 A1 * | 12/2005 | Cote et al. | 280/33.992 |
| 2007/0063464 A1 * | 3/2007 | Splain et al. | 280/33.992 |
| 2008/0196220 A1 * | 8/2008 | Wen-Po | 24/458 |
| 2009/0008525 A1 * | 1/2009 | Chekroune | 248/312 |
| 2011/0095496 A1 * | 4/2011 | Kassab Arabo | 280/33.992 |

* cited by examiner

CUP HOLDER FOR A SHOPPING CART

BACKGROUND OF THE INVENTION

Retailers devote considerable resources to shaping a customer's experience within a retail store to make shopping easier, more comfortable, and attractive. For example, stores around the world maintain fleets of shopping carts to facilitate a customer's selection, transport, and purchase of goods within those stores. One recent development includes the stores making beverages, such as premium coffee beverages, readily available for a customer while shopping in the store.

However, retailers have struggled to provide a convenient way for a customer to handle beverages while shopping. With a conventional shopping cart, a customer must continuously hold the beverage or rest the beverage on a portion of the shopping cart that is not adapted to hold the beverage. Many times a customer may set a beverage down in the store and misplace it because the customer did not have a place in the shopping cart to store the beverage. Prior attempts at adapting a conventional shopping cart to integrate a beverage holder into a portion of the shopping cart have failed to satisfy customer preferences while also meeting a retailer's goals of reliability and appearance.

Given their high profile in the retail environment and their impact on the experience of the consumer, beverage accessories for shopping carts should better serve to meet the needs and wants of consumers, especially in fast-moving, retail cultures.

BRIEF DESCRIPTION OF THE DRAWINGS

Embodiments of the invention will be described with respect to the figures, in which like reference numerals denote like elements, and in which.

DETAILED DESCRIPTION

Figure 1:
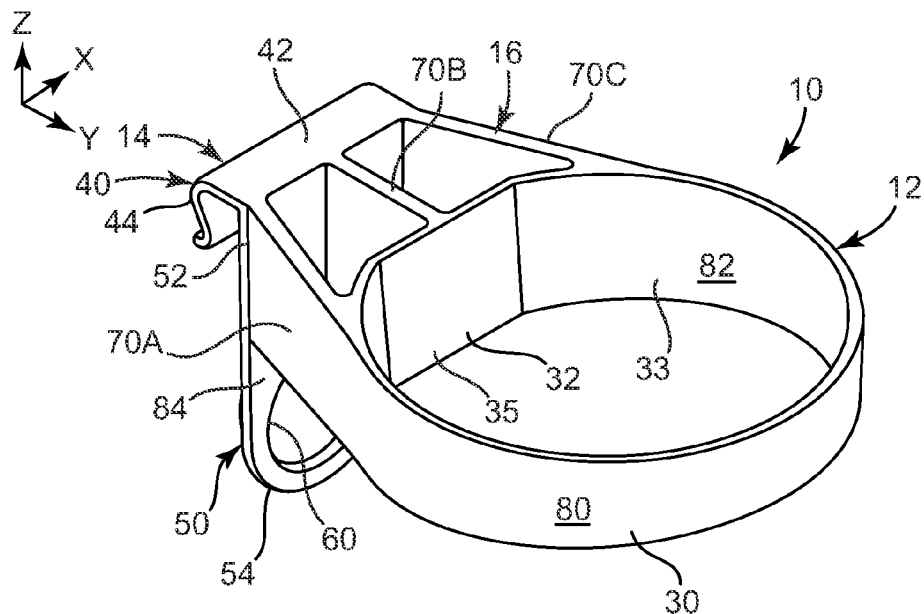
FIG. 1 is a perspective view of a cup holder for a shopping cart, according to an embodiment of the invention.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention are directed to a cup holder for a shopping cart. In one embodiment, a cup holder includes a container ring and a securing mechanism. The container ring is sized and shaped to slidably receive a beverage container and extends laterally outward from the securing mechanism. The securing mechanism includes a support arm defining a protrusion and a clasp. The clasp slidably engages a top edge of the wall of the shopping cart basket while the protrusion is configured to slidably engage a hole in the wall of the shopping cart basket to secure the support arm against the wall of the shopping cart basket. Once the cup holder is removably installed relative to the shopping cart, the clasp provides lateral stability while the protrusion in combination with the clasp provides vertical stability to the cup holder. Moreover, the support arm and the protrusion provide additional lateral stability to the cup holder when a beverage container is slidably inserted into a container ring of the cup holder because the weight of the beverage container effectively pushes a body of the support arm against the wall of the shopping cart basket and forcibly maintains the protrusion within the hole of the wall of the shopping cart basket. In one aspect, this arrangement also prevents inadvertent rotation of the securing mechanism and of the entire cup holder relative to a side wall of the shopping cart basket.

In one embodiment, the cup holder additionally comprises a spacer interposed between the container ring and the securing mechanism. In one aspect, when the cup holder is mounted underneath a handle of a shopping cart, the spacer is sized and shaped to position the container ring to be spaced laterally outward from the wall of the shopping cart basket. In another aspect, the spacer enables a customer to grasp a cup slidably mounted in the container ring of the cup holder because the spacer makes it easier for the customer to place their fingers between the beverage container and the wall of shopping cart basket.

In another embodiment, the cup holder omits the spacer and the container ring is connected directly to the securing mechanism.

In another aspect, a top edge of the securing mechanism extends in generally the same plane as a top edge of the container ring so that the cup holder maintains a low profile relative to a top edge of the shopping cart basket. This arrangement makes it less likely for the cup holder to be inadvertently bumped or grabbed. Moreover, when the cup holder is mounted on a shopping cart having a handle vertically above a wall of a basket of the shopping cart, this low profile arrangement enables the cup holder to be mounted below the handle of the shopping cart and enables the handle acts as a protective barrier to the cup holder.

These embodiments, and additional embodiments, are described and illustrated in association with FIGS. 1-8C.

FIG. 1 is a perspective view of a cup holder for a shopping cart, according to an embodiment of the invention. As illustrated in FIG. 1, cup holder 10 comprises a container ring 12 and a securing mechanism 14. In one embodiment, a spacer 16 is interposed between and extends between the container ring 12 and the securing mechanism 14.

In one embodiment, the container ring 12 comprises a generally circular portion 30 and a generally non-circular portion 32 with the generally circular portion 30 including an outer surface 80 and an inner surface 82. The generally circular portion 30 defines a substantially majority of container ring 12 and is sized and shaped to slidably receive a generally cylindrically shaped beverage container such as a coffee cup or soda cup. The generally non-circular portion 32 facilitates removal of a container from container ring 12 by providing a non-matching shape relative to a generally cylindrical shape of the beverage container slidably received within container ring 12. In one aspect, generally non-circular portion 32 comprises flat surface 35. In another aspect, generally non-circular portion 32 comprises additional surface topologies, as described and illustrated later in association with FIGS. 5A-5D. In another embodiment, inner surface 80 of container ring 12 omits generally non-circular portion 32 so that the generally circular portion 30 defines the entire periphery of the inner surface 80 of container ring 12.

In one embodiment, spacer 16 comprises an array 71 of walls 70A, 70B, 70C that extend between container ring 12 and a second side 84 of support arm 50. Walls 70A, 70B, 70C extend generally parallel to each other in a spaced apart relationship with wall 70B being interposed between outer walls 70A and 70C. In one aspect, spacer 16 maintains container ring 12 to be spaced apart from the support arm 50 in a first lateral direction (along axis y in FIG. 1).

In one embodiment, the securing mechanism 14 comprises a clasp 40 and a support arm 50. The support arm 50 includes a first end 52 and a second end 54 with the support arm 50 also defining a hole 60 at second end 54 of the support arm 50. Clasp 40 includes a base 42 and a spring arm 44. The base 42 of clasp 40 extends from the first end 52 of support arm 50 in a first lateral direction (along axis y) away from container ring 12. In one aspect, spring arm 44 of clasp 40 extends generally perpendicular to base 42 of clasp 40 and generally parallel to support arm 50 with spring arm 44 positioned to be generally opposite relative to body 53 (FIG. 2) of support arm 50.

Figure 2:
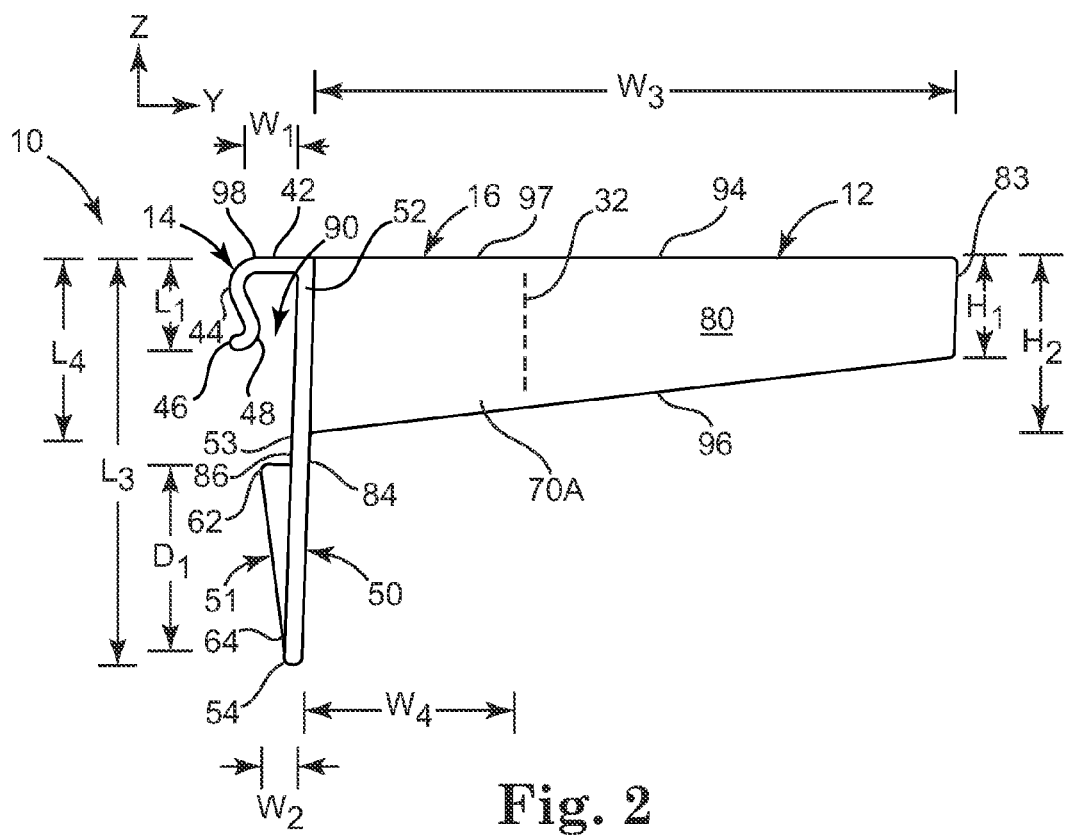
FIG. 2 is a side plan view of a cup holder for a shopping cart, according to an embodiment of the invention.

FIG. 2 is a side plan view of the cup holder 10, according to one embodiment of the invention. As illustrated in FIG. 2, support arm 50 includes body 53 extending between first end 52 and second end 54 with the second end 54 extending in a longitudinal direction (along axis z) from first end 52 of support arm 50 of securing mechanism 14. In one aspect, support arm 50 includes a ring protrusion 51 disposed at the second end 54 of the support arm 50. In one aspect, the ring protrusion 51 includes a first side 62 and a second side 64 with first side 62 having a width (W2) and second side 64 having a width substantially the same as or slightly greater than a thickness of support arm 50.

In another aspect, support arm 50 comprises a first side 84 and a second side 86 opposite the first side 84. In another aspect, spring arm 44 includes a curved portion 46 defining an apex 48 that protrudes toward body 53 of support arm 50 but is spaced from body 53 of support arm 50. In one aspect, cup holder 10 is made of a semi-rigid resilient plastic material with clasp 40 comprising a resilient element capable of flexible movement and biased to return to its original shape.

Figure 7:
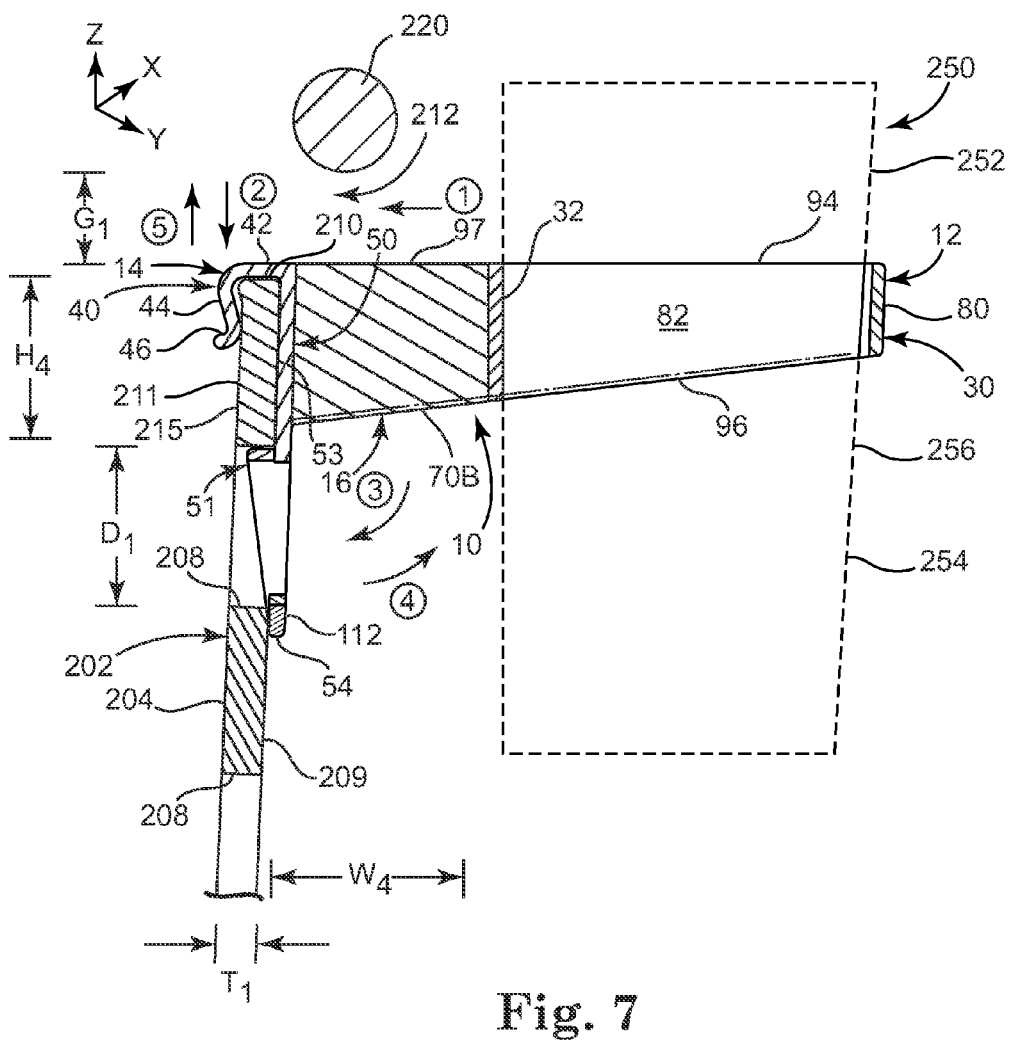
FIG. 7 is a sectional view of a cup holder removably mounted on a shopping cart, according to an embodiment of the invention.

In another aspect, as illustrated in FIG. 2, a gap 90 having a width (W1) is formed between apex 48 of clasp 40 and body 53 of support arm 50 with the width of gap 90 generally corresponding to a thickness of a side wall of a basket of a shopping cart (represented by T1 in FIG. 7). In another aspect, gap 90 has a width (represented by W1 in FIG. 2) that is substantially equal to a width (also represented by W2 in FIG. 2) of first side 62 of ring protrusion 51 of support arm 50.

In one embodiment, a top edge 98 of base 42 is generally parallel to a top edge 97 of spacer 16 and generally parallel to a top edge 94 of container ring 12. This arrangement enables cup holder 10 to maintain a low profile relative to a top portion of a shopping cart because the cup holder 10 does not include one any portion that protrudes upward more than another portion of the cup holder 10 when mounted on a wall of a shopping cart basket. In one aspect, container ring 12 also comprises bottom edge 96.

In one aspect, support arm 50 has a length (L3) substantially greater than a length (L1) of spring arm 44 of clasp 40 to enable ring protrusion 51 on support arm 50 to extend sufficiently downward from a top edge of a wall of the basket (of the shopping cart) to enable slidable insertion into a hole in the wall of the basket of the shopping cart. In another aspect, support arm 50 defines a hole 60 having a diameter (D1) with hole 60 being surrounded by ring protrusion 51. In one aspect, ring protrusion 51 is spaced from base 42 of clasp 40 by a distance (represented by L4) corresponding to the distance between a top edge of the wall of the shopping cart basket and a hole in the wall of the shopping cart basket, as later illustrated in association with FIG. 6. In another aspect, at outer end 83 of container ring 14, container ring 14 defines a height (H1) that is substantially less than a height (H2) of spacer 16 adjacent support arm 50. In another aspect, spacer 16 defines a width (W4) extending between container ring 12 and base 42 of clasp 40.

In another aspect, spacer 16 has a width (represented by W4 in FIG. 2) substantially greater than a width of clasp 40 (represented by W1 in FIG. 2). This relationship facilitates maintaining the lateral spacing of container ring 12, and therefore beverage container, relative to a side wall of a basket of a shopping cart as further illustrated later in association with FIGS. 6-7.

Figure 3:
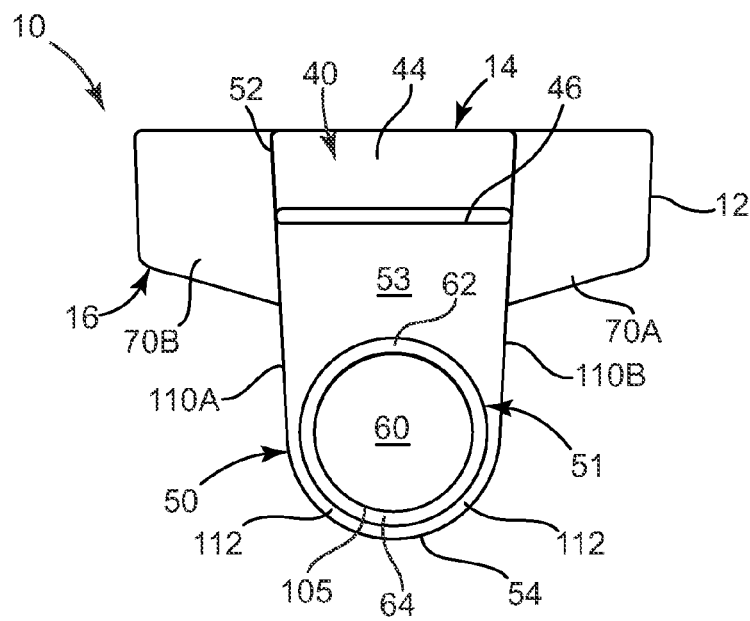
FIG. 3 is a rear plan view of a cup holder for a shopping cart, according to an embodiment of the invention.

FIG. 3 is a rear plan view of the cup holder 10, according to one embodiment of the invention, further illustrating securing mechanism 14 of cup holder 10. As illustrated in FIG. 3, securing mechanism 14 comprises body 53 of support arm 50, which comprises ring protrusion 51 and hole 60. In one aspect, ring protrusion 51 comprises a rib 105 extending upward from body 53 of support arm 50 with an apron 112 generally surrounding ring protrusion 51 at second end 54 of support arm 50. In another aspect, support arm 50 comprises a first side 110A and a second side 110B opposite the first side 110A. In one aspect, ring protrusion 51 has a size and a shape generally corresponding to a hole in a wall of a shopping cart basket to enable slidable insertion of the ring protrusion 51 into the hole of the wall of the shopping cart basket basket. This arrangement is further described and illustrated later in association with FIGS. 6-7. Moreover, apron 112 (of support arm 50 of cup holder 10) is positioned to contact the wall of the shopping cart basket (that surrounds the hole in the wall of the shopping cart basket) to limit insertion of ring protrusion 51 into the hole of the wall of the shopping cart basket to a depth generally corresponding to a width (W2 in FIG. 2) of the first side 62 of the ring protrusion 51. The apron 112 also stabilizes the support arm 50 against the wall of the shopping cart basket.

In one embodiment, ring protrusion 51 defines a generally circular shape while in other embodiments, ring protrusion 51 comprises other generally non-circular shapes, some of which are described and illustrated later in association with FIGS. 8A-8C.

Figure 4:
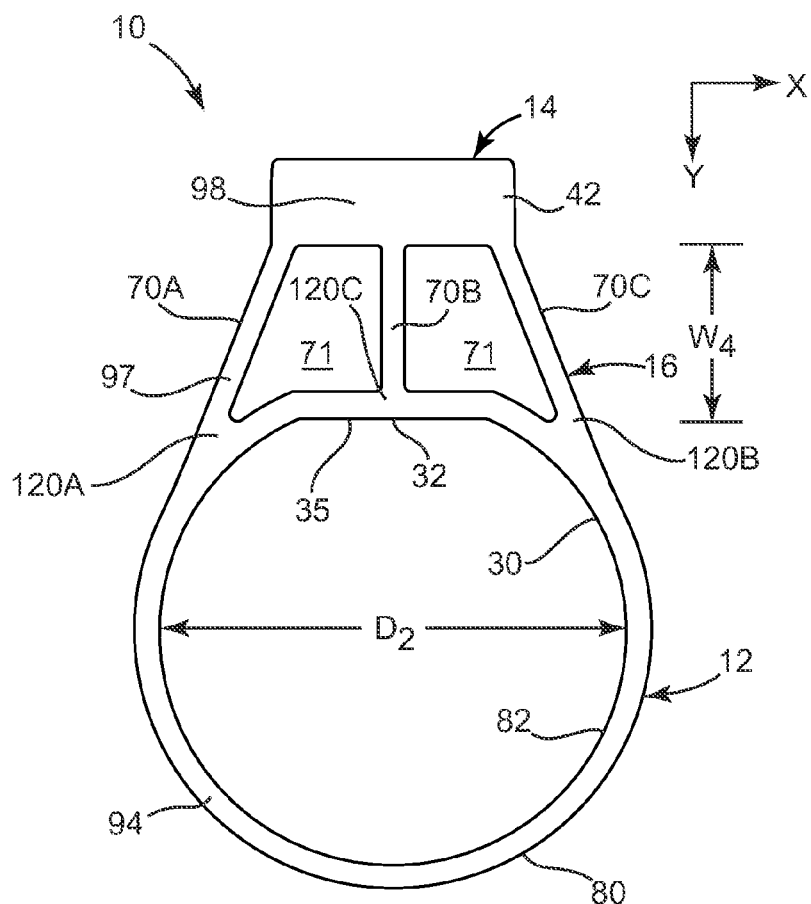
FIG. 4 is a top plan view of a cup holder for a shopping cart, according to an embodiment of the invention.

FIG. 4 is a top view of the cup holder 10, according to one embodiment of the invention, further illustrating container ring 12 and spacer 16. As illustrated in FIG. 4, in one embodiment, container ring 12 includes an outer surface 80 and inner surface 82. In one aspect, inner surface 82 defines a generally circular portion 30 and a generally non-circular portion 32 defining a generally flat surface 35. In other embodiments described later in association FIGS. 5A-5D, generally non-circular portion 32 of inner surface 82 of container ring 12 comprises other surface topologies that are not flat.

In another aspect, inner surface 82 of container ring 12 defines a diameter (D2) generally corresponding to a portion of a beverage container to enable slidable reception and frictional engagement of a wall of the beverage container relative to inner surface 82 of container ring 12 of cup holder 10.

Spacer 16 comprises middle wall 70B positioned between outer walls 70A and 70C with voids 71 extending between the respective spaced apart walls 70A, 70B, and 70C. In one aspect, walls 70A, 70B, 70C have a length (represented by W4) generally corresponding to width of spacer (W4 in FIGS. 2 and 4) extending between securing mechanism 14 and container ring 12. In another aspect, walls 70A-70C are also spaced apart from each other in a second lateral direction (along axis x) generally perpendicular to the first lateral direction (along axis y). The combination of separate walls 70A, 70B, 70C and intervening voids 71 provide considerable strength with less weight than if spacer 16 were a completely solid member. Moreover, this tri-wall structure enables outer walls 70A and 70C to extend from a relatively wide portion of container ring 12 at origins 120A, 120B of container ring 12, respectively, to provide greater stability for container ring 12 relative to securing mechanism 14. Middle wall 70B extends outwardly from generally non-circular portion 32 of container ring 12 at origin 120C. In one aspect, outer walls 70A, 70C are oriented to converge toward each other at base 42 of securing mechanism 14 and to diverge away from each other at container ring 12 of cup holder 10.

Figure 5A:
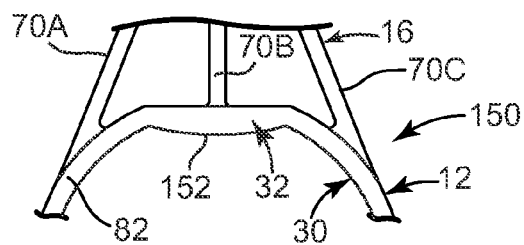
FIG. 5A is a partial top plan view of a portion of a cup holder, according to an embodiment of the invention.

FIG. 5A is a partial top view of a portion of a cup holder 150, according to an embodiment of the invention. As illustrated in FIG. 5A, cup holder 150 comprises substantially the same features and attributes as cup holder 10 as previously described and illustrated in association with FIGS. 1-4, except with generally non-circular portion 32 having a generally convex surface 152 instead of flat surface 35 illustrated in FIGS. 1 and 4. This generally convex surface 152 protrudes generally inward toward a center of the space defined by inner surface 82 of container ring 12. In one aspect, the generally convex surface 152 assists in the release of a beverage container by introducing a discontinuity in the contact and frictional engagement between an outer surface of the beverage container and the inner surface 82 of the container ring 12 of the cup holder 10.

Figure 5B:
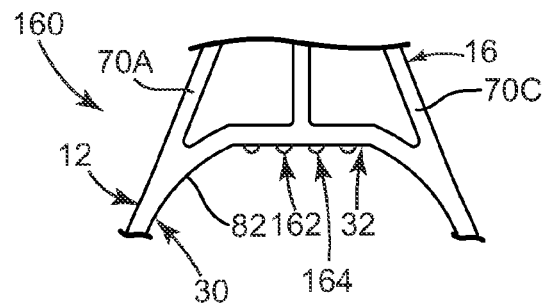
FIG. 5B is a partial top plan view of a portion of a cup holder, according to an embodiment of the invention.

FIG. 5B is a partial top view of a portion of a cup holder 160, according to an embodiment of the invention. As illustrated in FIG. 5B, cup holder 160 comprises substantially the same features and attributes as cup holder 10 as previously described and illustrated in association with FIGS. 1-4, except with generally non-circular portion 32 defining an array 162 of protrusions 164 instead of flat surface 35 illustrated in FIGS. 1 and 4.

Figure 5C:
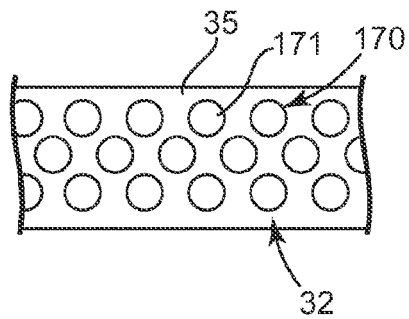
FIG. 5C is a partial top plan view of a portion of a cup holder, according to an embodiment of the invention.
Figure 5D:
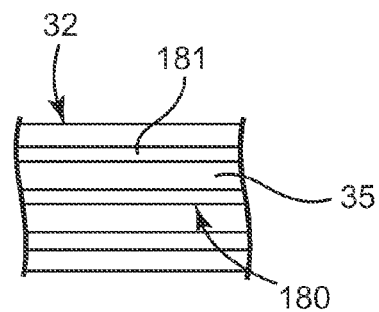
FIG. 5D is a partial top plan view of a portion of a cup holder, according to an embodiment of the invention.

FIG. 5C is a top plan view of the array 162 of protrusions 164 on generally non-circular portion 32, according to an embodiment of the invention, arranged as an array 170 of generally circular knobs 171 spaced apart from each other and extending upward from flat surface 35. FIG. 5D is a top plan view of the array 162 of protrusions 164 on generally non-circular portion 32, according to an embodiment of the invention, arranged as an array 180 of ribs 181 spaced apart from each other and extending upward from flat surface 35.

In one aspect, the array 162 of protrusions 164, as illustrated in FIGS. 5B and 5C, assists in the release of a beverage container by introducing a discontinuity in the contact and frictional engagement between an outer surface of the beverage container and the inner surface 82 of the container ring 12 of the cup holder 10.

In another embodiment, generally non-circular portion 32 of container ring 12 comprises a combination of the convex surface 152 of FIG. 5A and the protrusions 164, such as knobs or ribs, of FIGS. 5B-5D.

Figure 6:
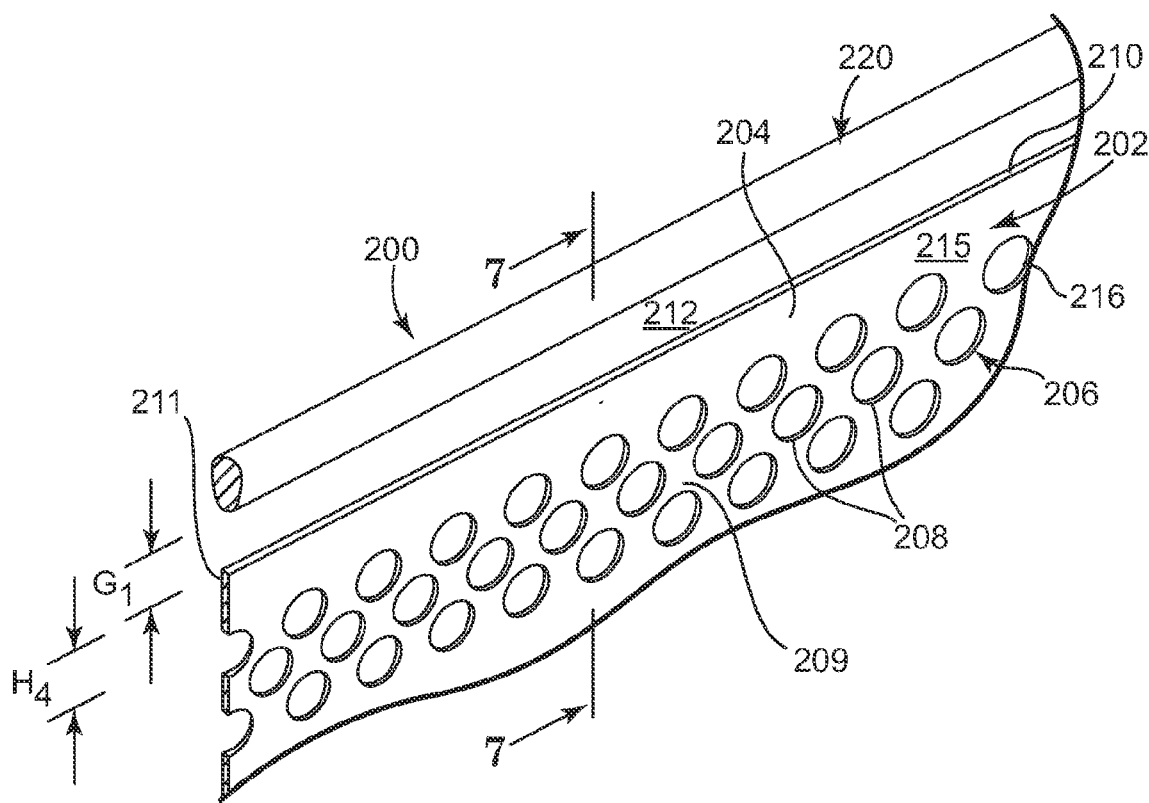
FIG. 6 is partial perspective view of a portion of a shopping cart for mounting a cup holder, according to an embodiment of the invention.

FIG. 6 is a partial perspective view of a shopping cart 200, according to an embodiment of the invention. As illustrated in FIG. 6, shopping cart 200 comprises basket 202 and handle 220 with basket 202 including side wall 204. Side wall 204 includes an array 206 of holes 208 as well as defining a first side 209 and a second side 211 opposite the first side 209. Side wall 204 of basket 202 also includes a top edge 210 with an upper portion 215 of side wall 204 extending between an upper most row 216 of holes 208 (extending generally parallel to top edge 210) and the top edge 210 of side wall 204. In one aspect, upper portion 215 of side wall 204 defines a height (represented by height H4 in FIGS. 6-7) that generally corresponds to a length (represented by L4 in FIG. 2) of support arm 50 extending between base 42 of securing mechanism 14 and first side 62 of ring protrusion 51 of securing mechanism 14.

In one aspect, handle 220 is vertically spaced above top edge 210 of side wall 204 (of basket 202 of shopping cart 200), thereby forming a gap 212 between handle 220 and top edge 210 of side wall 204 of basket 202 with gap 212 defining a width (GI). In one aspect, in some portions of the shopping cart 200, handle 220 extends in substantially the same plane as side wall 204 of basket 202 while in other portions of the shopping cart 200, handle 220 does not extend in the same plane as side wall 204 of basket 202 of the shopping cart 200 (as illustrated in FIG. 7).

In one embodiment, shopping cart 200 comprises substantially the same features and attributes as a shopping cart described and illustrated in U.S. Pat. D 530,478 (titled SHOPPING CART), and in pending U.S. patent application Ser. No. 11/231,364, filed Sep. 19, 2005 (titled SHOPPING CART BASKET), both of which are hereby incorporated by reference in their entirety.

FIG. 7 is a partial sectional view of a cup holder removably mounted on a side wall of a shopping cart basket, according to an embodiment of the invention. As illustrated in FIG. 7, mounting of cup holder 10 begins with advancing clasp 40 of cup holder 10 in a first lateral direction through gap 212 between handle 220 and top edge 210 of side wall 204 of basket 202 (as represented by directional arrow 1). Next, clasp 40 is slidably advanced downward in a second longitudinal direction (along axis z in FIG. 7) onto side wall 204 (as represented by directional arrow 2) until base 42 of clasp 40 is in contact with top edge 210 of side wall 204 of basket 202. During this action, resilient spring arm 44 of clasp 40 bends slightly backward to accommodate a width of the side wall 204 of the basket 202 and then maintains a small compressive force against second side 211 of side wall 204 of the basket 202 to help secure clasp 40 onto side wall 204 of basket 202.

After clasp 40 is removably secured onto side wall 204 of basket 202 of shopping cart 200, second end 54 of support arm 50 is rotated toward side wall 204 of basket 202 (as represented by directional arrow 3) until ring protrusion 51 slidably fits into hole 208 of side wall 204 of basket 202 and until body 53 of support arm 50 is in contact with first side 209 of side wall 204. In one aspect, in this position, first side 62 of ring protrusion 51 is in contact with, and frictionally engages, an edge of hole 208 of side wall 204 of basket 202 to removably secure ring protrusion 51 within hole 208 of side wall 204 of basket 202. This arrangement, in combination with the action of clasp 40, results in support arm 50 being releasably locked into place against side wall 204 of basket 202, and therefore releasably locks cup holder 10 onto basket 202 of shopping cart 200. In another aspect, apron 112 (surrounding ring protrusion 51) of support arm 50 is in contact with first side 209 of side wall 204 of basket 202, thereby limiting a depth of slidable insertion of ring protrusion 51 into hole 208 of side wall 204 of basket 202 and further anchoring support arm 50 of cup holder 10 relative to side wall 204 of shopping cart 200.

In this secured position, clasp 40 provides lateral stability to container ring 12 (and cup holder 10 generally) via spring arm 44 that clamps about side wall 204 opposite from body 53 of support arm 50. In one aspect, this lateral stability maintains container ring 12 in a first plane generally perpendicular to side wall 204 of basket 202 of shopping cart 200. In addition, a combination of clasp 40 (as removably secured about side wall 204 adjacent top edge 210) and ring protrusion 51 (as removably inserted into hole 208 of side wall 204) provides vertical stability to prevent cup holder 10 from being inadvertently vertically dislodged from basket 202 of shopping cart 200. Accordingly, clasp 40 prevents movement in a generally downward direction (along axis z in FIG. 7) while ring protrusion 51 prevents movement in a generally upward and opposite direction (along axis z in FIG. 7). Accordingly, securing mechanism 14 also maintains vertical stability of cup holder 10 in the second plane generally perpendicular to a first plane, through which container ring 12 extends when cup holder 10 is mounted on side wall 204 of shopping cart 200.

In another aspect, spacer 16 extends laterally outward beyond handle 220 and also provides a leverage arm (upon a beverage container 250 mounted in container ring 12) to forcibly maintain ring protrusion 51 within hole 208 in side wall 204 of basket 202 of shopping cart 200, which contributes to both the lateral stability and vertical stability of the cup holder 10.

In one aspect, beverage container 250 defines a generally cylindrical shape having a moderate conical surface and comprising an upper portion 252, a lower portion 254, and mid portion 256. Accordingly, upper portion 252 has a diameter greater than a diameter of mid portion 256 and lower portion 254, with mid portion 256 of beverage container 250 having a diameter generally corresponding to a diameter D2 (FIG. 4) of inner surface 80 of container ring 12.

To remove cup holder 10 from its mounted position on shopping cart 200, second end 54 of support arm 50 is rotated away from side wall 204 of basket 202 (as represented by directional arrow 4) until ring protrusion 51 is slidably removed from hole 208 of side wall 204. Next, clasp 40 of securing mechanism 14 is slidably moved upward from top edge 210 of side wall 204 of basket 202 and removed from the basket 202 of shopping cart 200 (as represented by directional arrow 5).

In one aspect, as illustrated in FIG. 7, spacer 16 enables securing mechanism 14 (e.g. clasp 40 and support arm 50) to removably secure cup holder 10 on shopping cart 200 while enabling container ring 12 to extend outwardly from basket 202 without interference from handle 220. In another aspect, as illustrated in FIG. 7, securing mechanism 14 does not extend above top edge 94 of container ring 12 and top edge 97 of spacer 16, and therefore securing mechanism 14 does not interfere with handle 220 when mounting cup holder 10 onto shopping cart 200.

Figures 8A, 8B, 8C:
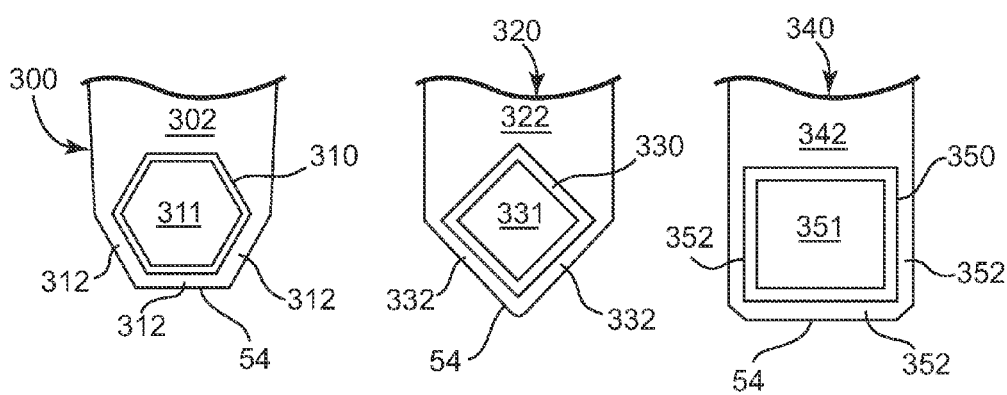
FIG. 8A is a partial rear plan view of a support arm of a cup holder, according to an embodiment of the invention.
FIG. 8B is a partial rear plan view of a support arm of a cup holder, according to an embodiment of the invention.
FIG. 8C is a partial rear plan view of a support arm of a cup holder, according to an embodiment of the invention.

FIG. 8A is a partial plan view of a support arm 300 of a cup holder, according to an embodiment of the invention. As illustrated in FIG. 8A, support arm 300 comprises substantially the same features and attributes as support arm 50 previously described and illustrated in association with FIGS. 1-7, except having a hexagonally shaped protrusion 310 instead of ring protrusion 51. In one embodiment, support arm 300 comprises body 302 defining the hexagonally shaped protrusion 310 which extends upward from body 302. In one aspect, hexagonally shaped protrusion both defines and surrounds a hexagonally shaped hole 311 with apron 312 surrounding generally hexagonally shaped protrusion 310 at second end 54 of support arm 300. In one aspect, hexagonally shaped protrusion 310 is sized and shaped to generally correspond to a size and a shape of a generally hexagonally shaped hole in a side wall of a basket of a shopping cart to enable mounting support arm 300 of a cup holder on such a shopping cart in a manner consistent with the mounting of cup holder 10 on shopping cart 200, as described and illustrated in association with FIGS. 6-7.

FIG. 8B is a partial plan view of a support arm 320 of a cup holder, according to an embodiment of the invention. As illustrated in FIG. 8B, support arm 320 comprises substantially the same features and attributes as support arm 50 previously described and illustrated in association with FIGS. 1-6, except having a diamond shaped protrusion 330 instead of ring protrusion 51. In one embodiment, support arm 320 comprises body 322 defining a generally diamond shaped protrusion 330 that extends upward from body 322 and that defines and surrounds a generally diamond shaped hole 331. In one aspect, an apron 332 of support arm 320 surrounds protrusion 330 at second end 54 of support arm 320. In another aspect, diamond shaped protrusion 330 is sized and shaped to generally correspond to a size and a shape of a generally diamond shaped hole in a side wall of a basket of a shopping cart to enable mounting support arm 320 of a cup holder on such a shopping cart in a manner consistent with the mounting of cup holder 10 on shopping cart 200, as described and illustrated in association with FIGS. 6-7.

FIG. 8C is a partial plan view of a support arm 340 of a cup holder, according to an embodiment of the invention. As illustrated in FIG. 8C, support arm 340 comprises substantially the same features and attributes as support arm 50 previously described and illustrated in association with FIGS. 1-6, except having a generally rectangular shaped protrusion 350 instead of ring protrusion 51. In one embodiment, support arm 340 comprises body 342 defining the generally rectangular shaped protrusion 350 that extends upward from body 342 and which defines and surrounds a generally rectangular shaped hole 351. In one aspect, apron 352 surrounds generally rectangular shaped protrusion 350 at second end 54 of support arm 340. In another aspect, rectangular shaped protrusion 350 is sized and shaped to generally correspond to a size and a shape of a generally rectangular shaped hole in a side wall of a basket of a shopping cart to enable mounting support arm 340 of a cup holder on such a shopping cart in a manner consistent with the mounting of cup holder 10 on shopping cart 200, as described and illustrated in association with FIGS. 6-7.

Embodiments of the invention enable removable and robust mounting of a cup holder onto a shopping cart. A securing mechanism of the cup holder promotes both lateral and vertical stability of the cup holder via a support arm including a combination of a clasp and a protrusion longitudinally spaced apart from each other with the clasp and the protrusion positioned in generally opposite orientation relative to each other.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A cup holder and a shopping cart in combination, comprising:
    a shopping cart including a basket, the basket having at least one wall with a hole therein;
    a container ring configured to removably hold a beverage container; and
    a securing mechanism for removably securing the container ring relative to the shopping cart, the securing mechanism including:
        a first portion configured for slidable mounting, in a first direction, onto a top edge of the wall of the basket of the shopping cart; and
        a second portion configured for slidable insertion, in a second direction generally perpendicular to the first direction, into the hole in the wall of the basket of the shopping cart, wherein the hole is disposed vertically below the top edge of the wall of the basket of the shopping cart, wherein the second portion comprises a protrusion extending in the second direction that is sized and shaped corresponding to the hole such that the protrusion is closely surrounded by an interior surface of the hole and an outer periphery of the protrusion directly contacts and frictionally engages the interior surface of the hole such that the protrusion contributes to vertical and lateral stability of the cup holder by restricting vertical and lateral movement of the cup holder relative to the at least one wall of the shopping cart, and wherein a through hole longitudinally extends through a center of the protrusion.

2. The cup holder and shopping cart of claim 1 and further comprising:
    a spacer interposed between the container ring and the securing mechanism to maintain the container ring laterally spaced apart from the securing mechanism in the first direction, the spacer having a width substantially greater than a width of the first portion of the securing mechanism.

3. The cup holder and shopping cart of claim 2 wherein the spacer comprises a plurality of walls extending between the container ring and the securing mechanism, the walls being generally parallel to each other and spaced apart from each other in a third direction generally perpendicular to the first direction.

4. The cup holder and shopping cart of claim 2 wherein the container ring comprises a generally circular portion and a generally non-circular portion.

5. The cup holder and shopping cart of claim 4 wherein the generally non-circular portion comprises at least one of: (1) a generally convex shape protruding inward toward a center of the generally circular portion; and (2) an array of protrusions.

6. The cup holder and shopping cart of claim 1 wherein the first portion of the securing mechanism comprises a clasp including a base and a spring arm extending from the base in the second direction.

7. The cup holder and shopping cart of claim 6 wherein the second portion of the securing mechanism comprises a support arm including a first end and a second end with a body extending between the first end and the second end,
    wherein the first end of the support arm is connected to the base of the clasp and the body and the second end of the support arm extend from the first end of the support arm in the second direction to position the body of the support arm to be spaced apart from and opposite the spring arm of the clasp, and
    wherein the second end of the support arm includes the protrusion extending toward the spring arm of the clasp with the protrusion spaced apart from the spring arm.

8. The cup holder and shopping cart of claim 7 wherein at least one portion of the protrusion has a width substantially equal to a gap between the spring arm of the clasp and the body of the support arm.

9. The cup holder and shopping cart of claim 7 wherein the protrusion comprises a generally ring shaped rib extending upward from a body of the support arm.

10. The cup holder and shopping cart of claim 7 wherein the protrusion comprises a rib extending upward from the body of the support arm and defining at least one of a generally diamond shaped member, a hexagonally shaped member, and a rectangular shaped member, depending on the shape of the hole.

11. The cup holder and shopping cart of claim 7 wherein the support arm has a length extending in a second direction that is substantially greater than a length of the spring arm of the clasp extending in the second direction, and wherein the length of the spring arm is less than a thickness of the container ring.

12. The cup holder and shopping cart of claim 7 wherein the spacer extends generally parallel to the first direction in generally same plane as the container ring, the first direction being generally parallel to a diameter of the container ring.

13. A method of carrying a cup holder on a shopping cart, the method comprising:
    providing a cup holder and a shopping cart, the cup holder including a container ring configured to slidably receive a beverage container and a securing mechanism configured to removably secure the cup holder relative to a basket of the shopping cart, wherein the securing mechanism comprises a first portion attachable to a top edge of a wall of the shopping cart basket and a second portion including a protrusion;
    slidably advancing, in a first direction, the first portion of the securing mechanism of the cup holder onto the top edge of the wall of the basket of the shopping cart; and
    slidably inserting, in a second direction generally perpendicular to the first direction, the protrusion of the second portion of the securing mechanism of the cup holder into a hole in the wall of the basket of the shopping cart, wherein the hole is disposed vertically below the top edge of the wall of the basket of the shopping cart,
    wherein the protrusion extends in the second direction and is sized and shaped corresponding to the hole such that the protrusion is closely surrounded by an interior surface of the hole and an outer periphery of the protrusion directly contacts and frictionally engages the interior surface of the hole such that the protrusion contributes to vertical and lateral stability of the cup holder by restricting vertical and lateral movement of the cup holder relative to the at least one wall of the shopping cart, and wherein a through hole longitudinally extends through a center of the protrusion.

14. The method of claim 13 wherein providing the cup holder comprises:
   arranging the first portion of the securing mechanism to be spaced apart from the second portion of the securing mechanism in the first direction.

15. The method of claim 14 wherein providing the cup holder comprises:
   arranging the first portion of the securing mechanism to be generally opposed to, and spaced apart from, the second portion of the securing mechanism in the second direction.

16. The method of claim 15 wherein providing the cup holder comprises:
   interposing a spacer between the securing mechanism and the container ring.

17. The cup holder and shopping cart of claim 1, wherein the securing mechanism further comprises an apron entirely surrounding the protrusion, the apron limiting an insertion depth of the protrusion in the hole and anchoring the second portion relative to the wall of the basket of the shopping cart.

18. The cup holder and shopping cart of claim 2, wherein the spacer is divided into two side-by-side sections separated by a planar wall, each section including a planar back wall substantially perpendicular the planar wall.

19. The cup holder and shopping cart of claim 18, wherein each of the spacer sections comprises a side wall aligned and extending with a portion of an exterior of the container ring.

* * * * *